(12) United States Patent
Southall et al.

(10) Patent No.: US 10,979,895 B2
(45) Date of Patent: Apr. 13, 2021

(54) NETWORK SYSTEM WITH REQUEST REDIRECT CAPABILITY FOR MSISDN HEADER ENRICHMENT

(71) Applicant: Boku, Inc., San Francisco, CA (US)

(72) Inventors: Jon Southall, Mill Valley, CA (US); Paul Russell McGuire, London (GB)

(73) Assignee: Boku, Inc., San Francisco, CA (US)

( * ) Notice: Subject to any disclaimer, the term of this patent is extended or adjusted under 35 U.S.C. 154(b) by 15 days.

(21) Appl. No.: 16/423,666

(22) Filed: May 28, 2019

(65) Prior Publication Data

US 2020/0015071 A1 Jan. 9, 2020

Related U.S. Application Data

(60) Provisional application No. 62/694,862, filed on Jul. 6, 2018.

(51) Int. Cl.
| | | |
|---|---|---|
| H04W 8/26 | (2009.01) | |
| H04W 8/20 | (2009.01) | |
| H04W 88/16 | (2009.01) | |
| H04L 29/12 | (2006.01) | |
| H04L 29/08 | (2006.01) | |

(52) U.S. Cl.
CPC .......... H04W 8/26 (2013.01); H04L 61/2007 (2013.01); H04L 61/6054 (2013.01); H04W 8/20 (2013.01); H04W 88/16 (2013.01); H04L 67/02 (2013.01)

(58) Field of Classification Search
CPC ... H04W 28/04; H04W 72/04; H04W 72/042; H04W 88/08; H04L 5/0007

USPC .......................................................... 370/329
See application file for complete search history.

(56) References Cited

U.S. PATENT DOCUMENTS

| | | | |
|---|---|---|---|
| 7,738,488 B2* | 6/2010 | Marsico | H04L 63/0892 370/466 |
| 8,213,913 B2* | 7/2012 | Ghai | H04L 45/7453 455/414.2 |
| 9,210,102 B1* | 12/2015 | Wise | H04L 41/5051 |
| 2006/0235735 A1* | 10/2006 | Sagfors | H04W 72/02 370/329 |
| 2008/0039086 A1 | 2/2008 | Gallagher et al. | |
| 2012/0039323 A1* | 2/2012 | Hirano | H04W 36/385 370/338 |
| 2012/0095905 A1* | 4/2012 | Hodges | H04M 15/06 705/39 |
| 2013/0083761 A1* | 4/2013 | Pandey | H04W 72/04 370/329 |
| 2013/0318346 A1* | 11/2013 | Libonate | H04L 63/068 713/168 |

(Continued)

OTHER PUBLICATIONS

International Search Report and Written Opinion dated Aug. 9, 2019, International PCT Patent Application No: PCT/US19/34139 with filing date of May 28, 2019, (8 pages).

*Primary Examiner* — Peter G Solinsky
*Assistant Examiner* — Sanjay K Dewan
(74) *Attorney, Agent, or Firm* — Stephen M. De Klerk

(57) ABSTRACT

A cellular device is used to make a first HTTP request to a host. The host returns a token to the cellular device. The cellular device sends a second HTTP request to a cellular data network in response to receiving the token. The cellular data network header-enriches the second HTTP request with the MSISDN of the cellular device and forwards the second request to the host.

18 Claims, 5 Drawing Sheets

(56) References Cited

U.S. PATENT DOCUMENTS

| | | | |
|---|---|---|---|
| 2013/0343257 A1* | 12/2013 | Maki | H04W 88/06 370/312 |
| 2014/0226606 A1* | 8/2014 | Nishigori | H04W 76/32 370/329 |
| 2014/0341109 A1* | 11/2014 | Cartmell | H04L 43/50 370/328 |
| 2014/0362807 A1 | 12/2014 | Bhatnagar et al. | |
| 2015/0117320 A1* | 4/2015 | Wang | H04L 12/1407 370/329 |
| 2015/0124617 A1* | 5/2015 | Luna | H04W 52/0258 370/235 |
| 2015/0163617 A1* | 6/2015 | Hall | H04W 88/08 455/414.1 |
| 2015/0358850 A1 | 12/2015 | La Roche, Jr. et al. | |
| 2016/0028665 A1* | 1/2016 | Yan | H04W 72/044 370/329 |

\* cited by examiner

NETWORK SYSTEM WITH REQUEST REDIRECT CAPABILITY FOR MSISDN HEADER ENRICHMENT

CROSS-REFERENCE TO RELATED APPLICATIONS

This application claims priority from U.S. Provisional Patent Application No. 62/694,862, filed on Jul. 6, 2018, all of which is incorporated herein by reference in its/their entirety.

BACKGROUND OF THE INVENTION

1). Field of the Invention

This invention relates to a network system and to a method of exchanging data.

2). Discussion of Related Art

Cellular devices are used for online activities such as making purchases, sending and receiving text messages, logging in to an account, etc. A host to which the cellular device connects may require a phone number in the form of a Mobile Station International Subscriber Directory Number (MSISDN) of the cellular device. When a text message arrives at the host, the text message includes the MSISDN of the cellular device. However, cellular devices commonly make use of the most effective network for making a request for downloading information from the Internet and such requests pass through a wireless router and the Internet to the host when the cellular device is connected to the wireless router. When the request sent through the wireless router arrives at the host, it lacks the MSISDN and the host is unable to complete an operation wherein a MSISDN is required, such as identifying account and end-user information attached to the MSISDN, billing the end-user account identified by the MSISDN, sending a text message to the cellular device and/or logging the cellular device into an account on the host or on a merchant server.

SUMMARY OF THE INVENTION

The invention provides a network system including a Packet Data Network Gateway (PGW) forming part of a first cellular data network; a directory listing stored on the PGW on the first cellular data network between a plurality of an International Mobile Subscriber Identities (IMSI's) and a plurality of Mobile Station International Subscriber Directory Numbers (MSISDN's), a Proxy Server forming part of the first cellular data network, a host, a first association, stored on at least one computing device, of an Internet Protocol (IP) address of the Proxy Server forming part the first cellular data network and the IP address of the host, a cellular device connected to the host to transmit a request from the cellular device to an IP address of the host, a routing system configured to route, due to the first association, the request from the cellular device to the IP address of the Proxy Server of the first cellular data network, the request including an IMSI of a Subscriber Identity Module (SIM) card of the cellular device, a lookup function on the PGW forming part of the first cellular data network to perform a lookup request based on the IMSI in the request from the cellular device, to determine a MSISDN of the cellular device from the directory listing between the plurality of IMSI's and the plurality of MSISDN's, a header enrichment service on the first cellular data network, to header-enrich the request with the MSISDN of the cellular device and forwarding protocol on the Proxy Server to forward the request to the host including the MSISDN of the cellular device.

The network system may further include that the first association of the Internet Protocol (IP) address of a Proxy Server is created by storing the IP address of the Proxy Server on the host, wherein the request that is transmitted by the cellular device is a first request, further including a redirect agent on the host to receive the first request at the host, transmit, by the host in response to the first request, a response to the cellular device, the response including the IP address of the Proxy Server on the first cellular data network, wherein the cellular device receives the response, wherein the routing of the request includes transmitting, by the cellular device, a second request to the IP Address of the Proxy Server on the first cellular data network received in the token.

The network system may further include that the response includes a token, being a random number, and the forwarding protocol on the Proxy Server on the first cellular data network forwards the token to the host.

The network system may further include that the first request is a Hypertext Transfer Protocol (HTTP) request through a wireless router and the Internet to the host.

The network system may further include that the response to the first request is a HTTP request through the Internet and the wireless router to the cellular device.

The network system may further include that the second request is to a cellular phone tower on the first cellular network.

The network system may further include that the response includes a script that is executable by a browser on the cellular device, the script redirecting the browser to the IP address of the Proxy Server.

The network system may further include that the script adjusts a pointer on a routing table used by a browser logic of the browser.

The network system may further include that the routing table includes a plurality of destination IP's (DIP's) and a plurality of network interfaces (NI's) wherein the pointer points to a DIP within a range of the IP address of the host before the pointer is adjusted and points to a DIP within a range of the IP address of the Proxy Server after the pointer is adjusted.

The invention also provides a method of exchanging data including storing a directory listing between a plurality of an International Mobile Subscriber Identities (IMSI's) and a plurality of Mobile Station International Subscriber Directory Numbers (MSISDN's) on a Packet Data Network Gateway (PGW) forming part of a first cellular data network, associating, with at least one computing device, an Internet Protocol (IP) address of a Proxy Server forming part the first cellular data network with the IP address of a host, transmitting, by the cellular device, a request from the cellular device to an IP address of the host, routing, due to the first association, the request from the cellular device to the IP address of the Proxy Server of the first cellular data network, the request including an IMSI of a Subscriber Identity Module (SIM) card of the cellular device, performing, by the PGW forming part of the first cellular data network, a lookup request based on the IMSI in the request from the cellular device, to determine a MSISDN of the cellular device from the directory listing between the plurality of IMSI's and the plurality of MSISDN's, header-enriching, by a header enrichment service on the first cellular data network, the request with the MSDN of the cellular device and forwarding, by the Proxy Server, the request to the host including the MSISDN of the cellular device.

The method may further include that the first association of the Internet Protocol (IP) address of a Proxy Server is created by storing the IP address of the Proxy Server on the host, wherein the request that is transmitted by the cellular device is a first request, further including receiving the first request at the host, transmitting, by the host in response to the first request, a response to the cellular device, the response including the IP address of the Proxy Server on the first cellular data network and receiving, by the cellular device, the response, wherein the routing of the request includes transmitting, by the cellular device, a second request to the IP Address of the Proxy Server on the first cellular data network received in the response.

The method may further include that the response includes a token, being a random number, forwarding, with the Proxy Server on the first cellular data network, the token to the host.

The method may further include that the first request is a Hypertext Transfer Protocol (HTTP) request through a wireless router and the Internet to the host.

The method may further include that the response to the first request is a HTTP request through the Internet and the wireless router to the cellular device.

The method may further include that the second request is to a cellular phone tower on the first cellular network.

The method may further include that the response includes a script that is executable by a browser on the cellular device, the script redirecting the browser to the IP address of the Proxy Server.

The method may further include that the script adjusts a pointer on a routing table used by a browser logic of the browser.

The method may further include that the routing table includes a plurality of destination IP's (DIP's) and a plurality of network interfaces (NI's) wherein the pointer points to a DIP within a range of the IP address of the host before the pointer is adjusted and points to a DIP within a range of the IP address of the Proxy Server after the pointer is adjusted.

BRIEF DESCRIPTION OF THE DRAWINGS

The invention is further described by way of examples with reference to the accompanying drawings, wherein.

DETAILED DESCRIPTION OF THE INVENTION

Figure 1A:
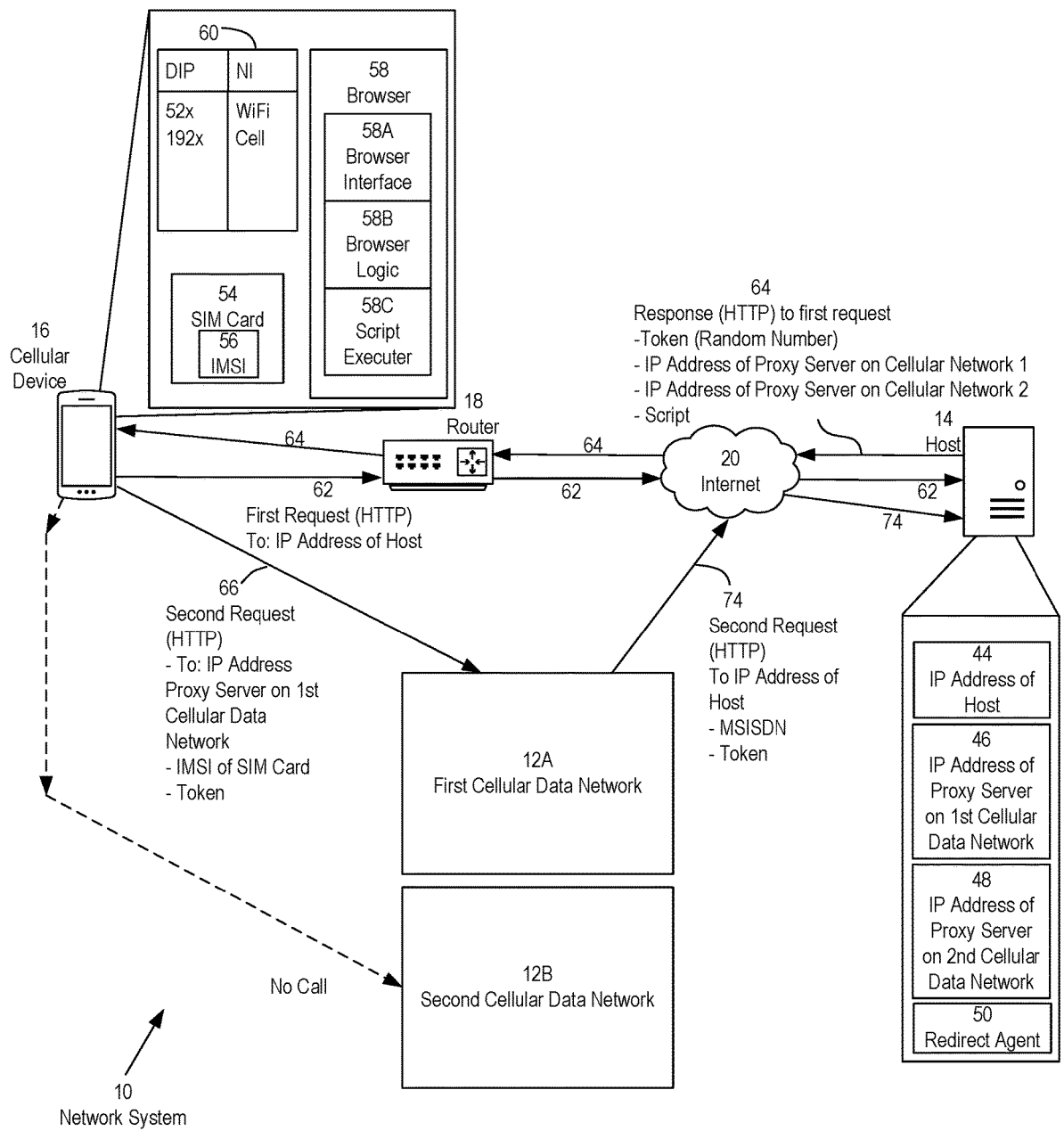
FIGS. 1A and 1B are block diagrams illustrating a network system according to one embodiment of the invention.
Figure 1B:
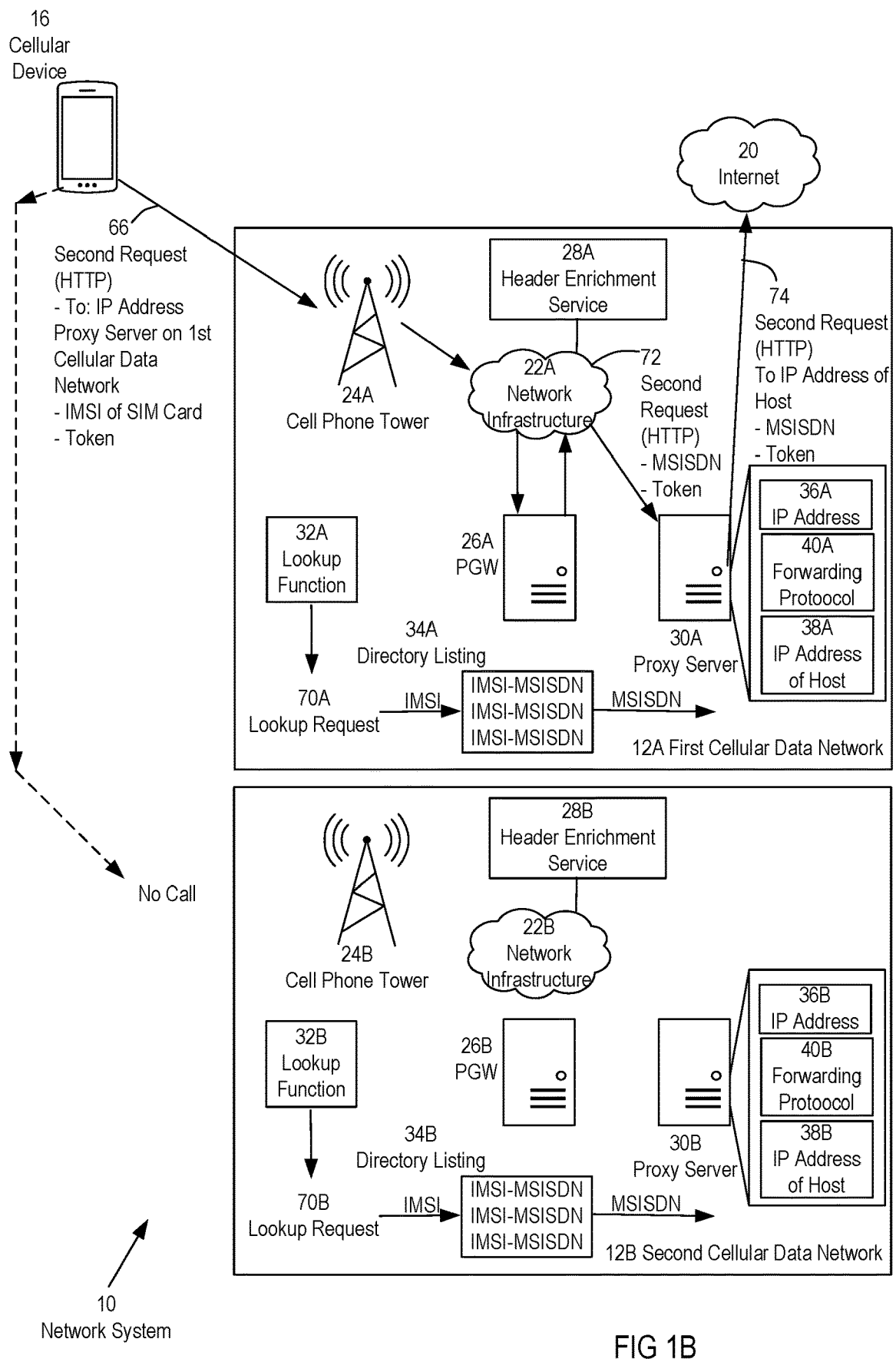

FIGS. 1A and 1B of the accompanying drawings illustrates a network system 10, according to an embodiment of the invention that includes first and second cellular data networks 12A and 12B, a host 14, a cellular device 16, a router 18 and the Internet 20.

The first cellular data network 12A includes a network infrastructure 22A, a cell phone tower 24A, a packet data network gateway (PGW) 26A, a header enrichment service 28A and a proxy server 30A connected to the network infrastructure 22A.

The PGW 26A includes a lookup function 32A and a directory listing 34A. The directory listing 34A includes a plurality of International Mobile Subscriber Identities (IMSI's) and a plurality of Mobile Station International Subscriber Directory Numbers (MSISDN's). The IMSI's all differ from one another and the MSISDN's all differ from one another. Each MSISDN is uniquely associated with a respective IMSI in the directory listing 34A.

The proxy server 30A has its own IP address 36A, an IP address 38A of the host 14 and a forwarding protocol 40A.

The second cellular data network 12B includes the same components as the first cellular data network 12A. Similar reference numerals indicate similar components. The directly listing 34B has a different set of IMSI's and MSISDN's than the directory listing 34A. The directory listings 34A and 34B reflect the ISMI's and MSISDN's of the cellular devices that are connected to the respective cellular data network 12A or 12B. The IP addresses 36A and 36B of the proxy servers 30A and 30B differ from one another.

The host 14 has its own IP address 44, an IP address 46 of the proxy server 30A on the first cellular data network 12A, an IP address 48 of the proxy server 30B on the second cellular data network 12B and a redirect agent 50. The components 44, 46, 48 and 50 are stored in memory or on another computer-readable medium connected to a processor of the host 14. The IP address 44 of the host 14 is thereby associated with the IP address 46 of the proxy server 30A on the first cellular data network 12A. The IP address 44 of the host 14 is also associated with the IP address 48 of the proxy server 30B on the second cellular data network 12B.

The cellular device 16 includes a subscriber identity module (SIM) card 54 that holds a unique IMSI 56. The cellular device 16 further has a browser 58. The browser 58 may be stand alone browser or may form part of a mobile app. The browser 58 includes a browser interface 58A, a browser logic 58B, and a script executer 58C. The browser interface 58A is viewable on the display based on hypertext markup language (HTML) or other formats. The browser logic 58B is the functional logic that displays the browser interface 58A and navigates the browser 58 to different pages and downloads the pages. The script executer 58C is capable of receiving a script, such as a Javacript™ script, identifying the script, extracting the script, and executing a set of instructions in the script.

The cellular device uses a first protocol to transmit and receive signals over a wireless router and the Internet and a second protocol, that is different than the first protocol, to transmit and receive signal to and from a cellular phone tower and a cellular data network. A routing table 60 includes a plurality of destination IP (DIP) entries and a plurality of network interface (NI) entries. The browser logic 58B uses the routing table 60 to determine which network interface resource to use for transmitting requests of data. If the DIP is in the range of 52X then the browser logic 58B uses Wifi for routing and when the DI is 192X, then the browser logic 58B uses cellular for routing.

The cellular device 16 has an antenna (not shown) that connects the cellular device 16 wirelessly to the router 18. The antenna is of sufficient strength to connect the cellular device 16 to the cell phone towers 24A and 24B. The router 18, host 14 and the proxy servers 30A and 30B are all connected to one another through the Internet 20.

In use, a person uses the cellular device 16 to access the browser 58. The person uses the browser 58 to make a first request 62. The first request 62 is a Hypertext Transfer Protocol (HTTP) request to the IP address 44 of the host 14. The IP address 44 of the host 14 is in the range 52X so that cellular device 16 selects the most efficient path for the first request 62, which is through the router 18 and the Internet 20 to the host 14. The first request 62 is for a website on the host 14. The first request 62 includes an IP address of the cellular device 16, but does not include the IMSI 56 on the SIM card 54 or a MSISDN of the cellular device 16.

The redirect agent 50 on the host 14 receives the first request 62 at the host 14. The redirect agent 50 then transmits a response 64, which is a response by the host 14 to the first request 62. The response 64 is an HTTP response. The response 64 includes a token, the IP address 46 of the proxy server 30A on the first cellular data network 12A, and the IP address 48 of the proxy server 30B on the second cellular data network 12B. The token is a random number that is generated by the host 14 in response to the first request 62. The response 64 is transmitted by the host 14 through the Internet 20 and the router 18 to the cellular device 16.

The browser 58 receives the response 64 and the script executer 58C identifies the script, extracts and executes the script. The script changes a pointer in the routing table 60 based on the IP Address of the Proxy Servers received in the response. The response 64 may, for example, include the IP addresses 192.65.5.108 and 172.25.10.200, corresponding to the IP addresses 36A and 36B, respectively. The script executer 58C finds the first IP address within the routing table 60, namely 192X, but fails to find the second IP address within the routing table 60. The IP address that is included in a particular routing table of a particular cellular device depends on the particular cellular data network that the cellular device belongs to.

The browser logic 58B then uses the first IP address extracted from the response to send a second request 66 to the IP address 36A of the proxy server 30A and a makes no call to the IP address 36B of the proxy server 30B. The second request 66 is a HTTP request. The second request 66 is sent to the cell phone tower 24A. The second request 66 includes the IMSI 56 of the SIM card 54. The second request 66 includes the token holding the random number. The second request 66 is automatically transmitted by the browser 58 in response to receiving the response 64.

The lookup function 32A forming part of the PGW 26A receives the second request 66 and performs a lookup request 70A based on the IMSI received from the cellular device 16. The lookup request 70A determines an MSISDN of the cellular device 16 from the directory listing 34A. As noted, the directory listing 34A includes a listing between a plurality of IMSI's and a plurality of MSISDN's. In the present example, the cellular device 16 is a member of the first cellular data network 12A and a MSISDN can be found in the directory listing 34A. The cellular device 16A is, however, not a member of the second cellular data network 12B. When the lookup function 32B performs a lookup request 70B, no MSISDN can be found in the directory listing 34B. The call to the second cellular data network 12B then fails.

The PGW 26A passes the MSISDN extracted from the directory listing 34A to the header enrichment service 28A. The header enrichment service 28A header-enriches the second request 66 with the MSISDN of the cellular device 16 extracted from the directory listing 34A. The header enrichment service 28A transmits the second request 66 as a second request 72 to the proxy server 30A. The second request 72 includes the same header information as the second request 66 with the addition of the MSISDN. The proxy server 30A has the IP address 38A of the host 14. The forwarding protocol 40A receives the second request 72 and transmits the second request 72 as a second request 74 via the Internet 20 to the IP address 44 of the host 14. The second request 74 includes the MSISDN and the token. The host 14 receives the second request 74. The random number in the token received in the second request 74 allows the host 14 to match the second request 74 to the first request 62. The host 14 also matches the MSISDN in the second request 74 to the first request 62.

It can thus be seen that a user of the cellular device 16 can send a first request 62 to the host 14, i.e. an HTTP request for a web site, without having to enter their MSISDN on to a web page. A routing system is provided wherein the first request 62 is redirected through the first cellular data network 12A so that the host 14 can identify the MSISDN of the cellular device 16. The host 14 can then use the MSISDN for carrying out carrier billing to an account identified by its MSISDN on the first cellular data network 12A, send a text message to the cellular device 16 and/or log the cellular device 16 into an account on the host 14 or on a merchant server and/or identify a new or existing user.

Figure 2:
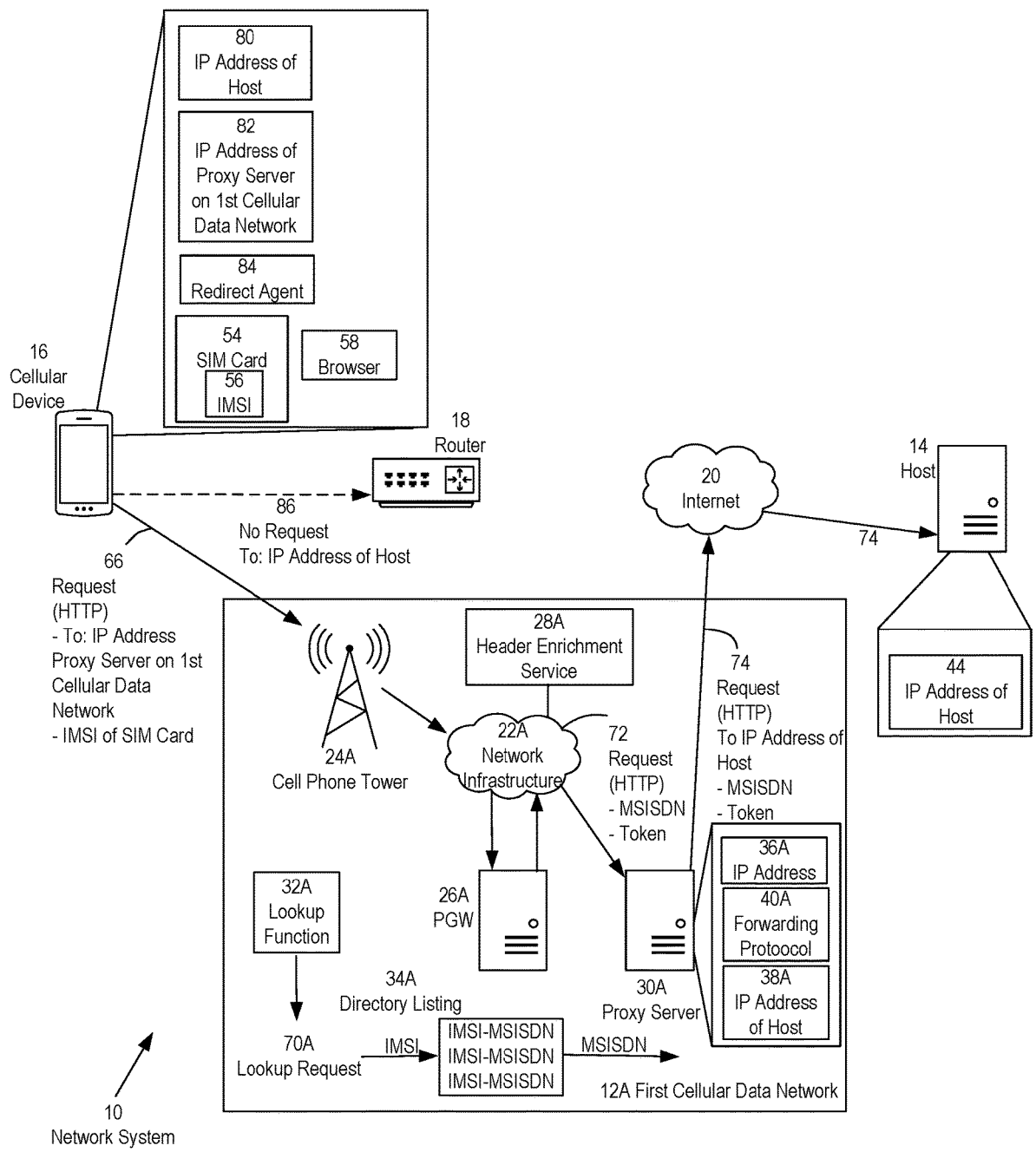
FIG. 2 is a block diagram of a network system according to another embodiment of the invention.

FIG. 2 illustrates another way of creating and storing a relationship between an IP address of the host 14 and an IP address of the proxy server 30A. The cellular device 16 has, stored thereon, an IP address 80 of the host 14, an IP address 82 of the proxy server 30A on the first cellular data network 12A, and a redirect agent 84. The IP addresses 80 and 82 are thus associated with one another on the cellular device 16.

In use, the user uses the browser 58 to attempt to make a request at 86 to the IP address 44 of the host 14. The redirect agent 84 detects that the IP address that the browser 58 is using is the same as the IP address 80 and terminates the request at 86. The redirect agent 84, at 66, transmits a request to the IP address 82 stored on the cellular device 16. The second request 66 is an HTTP request. The first cellular data network 12A then processes the second request 66 in FIG. 2 in the same manner as the second request 66 in FIG. 1.

FIG. 2 shows that it is possible to store a relationship between the IP address of the host 14 and the IP address of the proxy server 30A on different computing devices of a network system and have a redirect agent on different computing devices within the network system 10. Other embodiments having different routing systems may readily occur to one of ordinary skill in the art.

Figure 3:
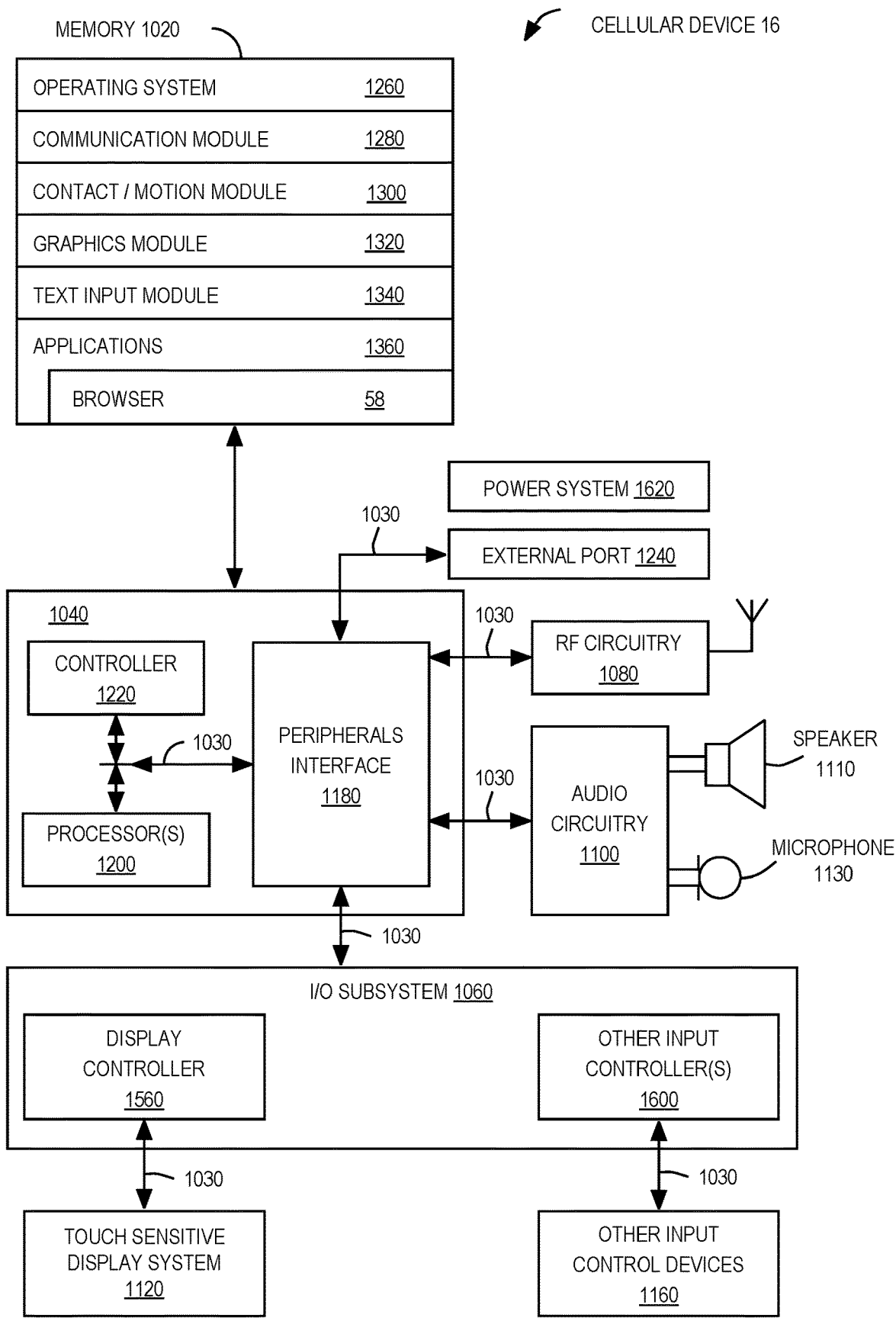
FIG. 3 is a block diagram of the cellular device illustrating SmartPhone features thereof.

FIG. 3 is a block diagram illustrating the cellular device 16, illustrating a touch-sensitive display 1120 or a "touch screen" for convenience. The cellular device 16 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 3 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the cellular device 16, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the cellular device 16 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the cellular device 16. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the cellular device 16, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the cellular device 16 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The cellular device 16 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., iOS, Android or Windows) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), LIGHTNING, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include a mobile application such as the browser 58.

Figure 4:
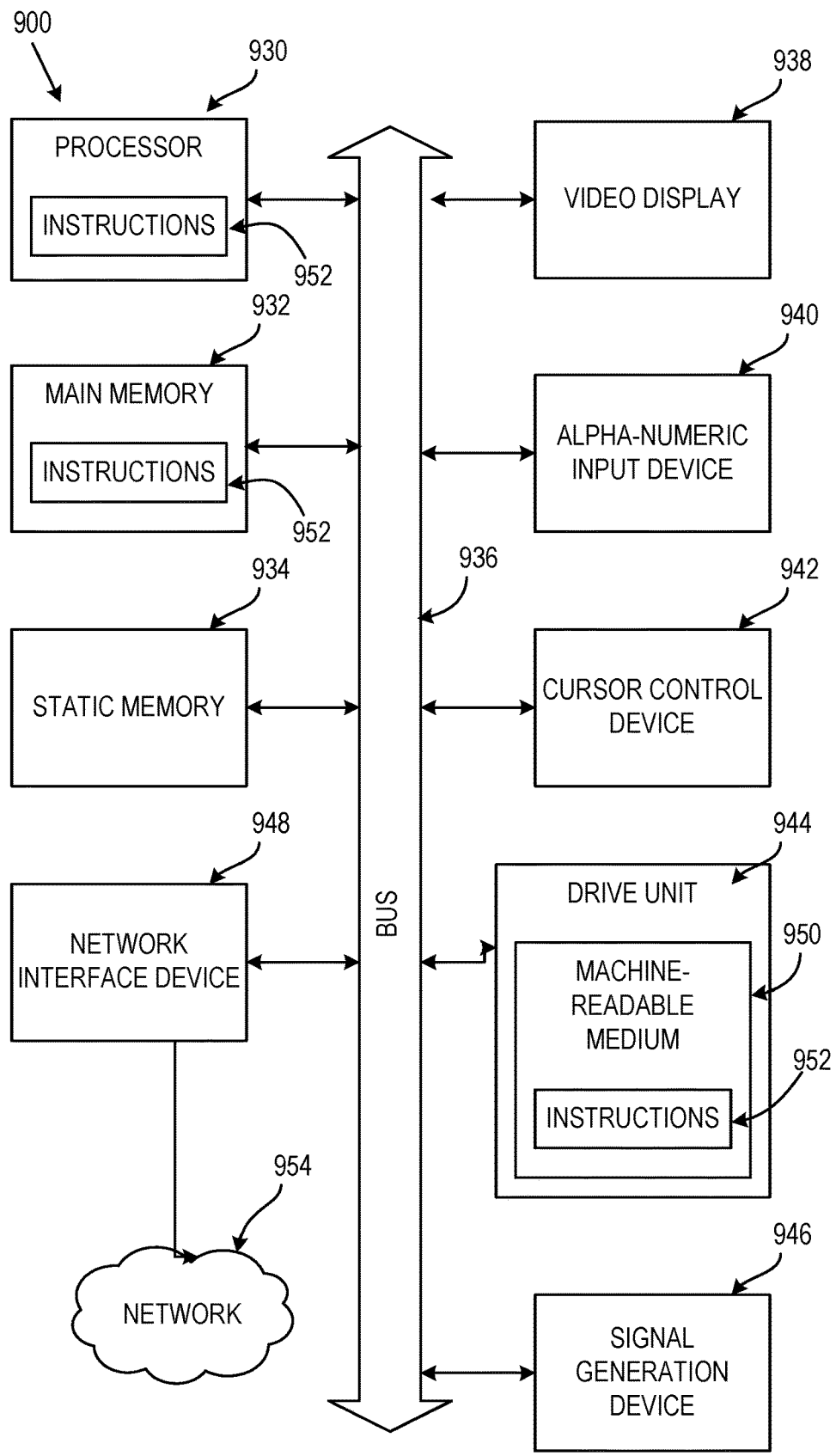
FIG. 4 is a block diagram of a machine in the form of a computer system forming part of the network system.

FIG. 4 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the main memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A network system comprising:
a Packet Data Network Gateway (PGW) forming part of a first cellular data network;
a directory listing stored on the PGW on the first cellular data network between a plurality of an International Mobile Subscriber Identities (IMSI's) and a plurality of Mobile Station International Subscriber Directory Numbers (MSISDN's);
a Proxy Server forming part of the first cellular data network;
a host;
a first association, stored on at least one computing device, of an Internet Protocol (IP) address of the Proxy Server forming part the first cellular data network and the IP address of the host;
a cellular device connected to the host to transmit a request from the cellular device to an IP address of the host;
a routing system configured to route, due to the first association, the request originally made by the cellular device to the IP address of the host from the cellular device to the IP address of the Proxy Server of the first cellular data network instead of from the cellular device to the IP address of the host, the request including an IMSI of a Subscriber Identity Module (SIM) card of the cellular device;
a lookup function on the PGW forming part of the first cellular data network to perform a lookup request based on the IMSI in the request from the cellular device, to determine a MSISDN of the cellular device from the directory listing between the plurality of IMSI's and the plurality of MSISDN's;
a header enrichment service on the first cellular data network, to header-enrich the request with the MSISDN of the cellular device; and
forwarding protocol on the Proxy Server to forward the request to the host including the MSISDN of the cellular device.

2. The network system of claim 1, wherein the first association of the Internet Protocol (IP) address of a Proxy Server is created by storing the IP address of the Proxy Server on the host, wherein the request that is transmitted by the cellular device is a first request, further comprising:

a redirect agent on the host to receive the first request at the host, transmit, by the host in response to the first request, a request to the cellular device, the request including the IP address of the Proxy Server on the first cellular data network, wherein the cellular device receives the request, wherein the routing of the request includes transmitting, by the cellular device, a second request to the IP Address of the Proxy Server on the first cellular data network received in the response.

3. The network system of claim 2, wherein the response includes a token, being a random number, and the forwarding protocol on the Proxy Server on the first cellular data network forwards the token to the host.

4. The network system of claim 2, wherein the first request is a Hypertext Transfer Protocol (HTTP) request through a wireless router and the Internet to the host.

5. The network system of claim 2, wherein the response to the first request is a HTTP request through the Internet and the wireless router to the cellular device.

6. The network system of claim 2, wherein the second request is to a cellular phone tower on the first cellular network.

7. The network system of claim 2, wherein the response includes a script that is executable by a browser on the cellular device, the script redirecting the browser to the IP address of the Proxy Server.

8. The network system of claim 2, wherein the script adjusts a pointer on a routing table used by a browser logic of the browser.

9. The network system of claim 8, wherein the routing table includes a plurality of destination IP's (DIP's) and a plurality of network interfaces (NI's) wherein the pointer points to a DIP within a range of the IP address of the host before the pointer is adjusted and points to a DIP within a range of the IP address of the Proxy Server after the pointer is adjusted.

10. A method of exchanging data comprising:

storing a directory listing between a plurality of an International Mobile Subscriber Identities (IMSI's) and a plurality of Mobile Station International Subscriber Directory Numbers (MSISDN's) on a Packet Data Network Gateway (PGW) forming part of a first cellular data network;

associating, with at least one computing device, an Internet Protocol (IP) address of a Proxy Server forming part the first cellular data network with the IP address of a host;

transmitting, by the cellular device, a request from the cellular device to an IP address of the host;

routing, due to the first association, the request originally made by the cellular device to the IP address of the host from the cellular device to the IP address of the Proxy Server of the first cellular data network instead of from the cellular device to the IP address of the host, the request including an IMSI of a Subscriber Identity Module (SIM) card of the cellular device;

performing, by the PGW forming part of the first cellular data network, a lookup request based on the IMSI in the request from the cellular device, to determine a MSISDN of the cellular device from the directory listing between the plurality of IMSI's and the plurality of MSISDN's;

header-enriching, by a header enrichment service on the first cellular data network, the request with the MSDN of the cellular device; and forwarding, by the Proxy Server, the request to the host including the MSISDN of the cellular device.

11. The method of claim 10, wherein the first association of the Internet Protocol (IP) address of a Proxy Server is created by storing the IP address of the Proxy Server on the host, wherein the request that is transmitted by the cellular device is a first request, further comprising:

receiving the first request at the host;

transmitting, by the host in response to the first request, a response to the cellular device, the response including the IP address of the Proxy Server on the first cellular data network; and receiving, by the cellular device, the response, wherein the routing of the request includes transmitting, by the cellular device, a second request to the IP Address of the Proxy Server on the first cellular data network received in the response.

12. The method of claim 11, wherein the response includes a token, being a random number, further comprising:

forwarding, with the Proxy Server on the first cellular data network, the token to the host.

13. The method of claim 11, wherein the first request is a Hypertext Transfer Protocol (HTTP) request through a wireless router and the Internet to the host.

14. The method of claim 11, wherein the response to the first request is a HTTP request through the Internet and the wireless router to the cellular device.

15. The method of claim 11, wherein the second request is to a cellular phone tower on the first cellular network.

16. The method of claim 11, wherein the response includes a script that is executable by a browser on the cellular device, the script redirecting the browser to the IP address of the Proxy Server.

17. The method of claim 16, wherein the script adjusts a pointer on a routing table used by a browser logic of the browser.

18. The method of claim 17, wherein the routing table includes a plurality of destination IP's (DIP's) and a plurality of network interfaces (NI's) wherein the pointer points to a DIP within a range of the IP address of the host before the pointer is adjusted and points to a DIP within a range of the IP address of the Proxy Server after the pointer is adjusted.

* * * * *